United States Patent [19]

Liechti

[11] Patent Number: 4,807,139

[45] Date of Patent: Feb. 21, 1989

[54] SYSTEM FOR RELEASE AND CONTROL OF PRESET STORAGE OF A POSTAGE METER MACHINE

[75] Inventor: Hans-Peter Liechti, Lanzenhäusern, Switzerland

[73] Assignee: Ascom Hasler AG, Bern, Switzerland

[21] Appl. No.: 889,227

[22] Filed: Jul. 25, 1986

Related U.S. Application Data

[63] Continuation-in-part of PCT CH86/00031, filed Mar. 6, 1986, published as W086/05611 on Sep. 25, 1986

[30] Foreign Application Priority Data

Mar. 15, 1985 [CH] Switzerland ....................... 01168/85

[51] Int. Cl.⁴ ................................................ G06F 15/20

[52] U.S. Cl. ................................ 364/464.02; 380/23; 380/25

[58] Field of Search .................. 364/464, 466; 380/23, 380/25, 28, 29

[56] References Cited

U.S. PATENT DOCUMENTS

| | | | |
|---|---|---|---|
| 3,654,604 | 4/1972 | Crafton | 380/24 X |
| 4,097,923 | 6/1978 | Eckert, Jr. et al. | 364/900 |
| 4,122,532 | 10/1978 | Dlugos et al. | 364/900 |
| 4,193,131 | 3/1980 | Lennon et al. | 380/25 |
| 4,219,151 | 8/1980 | Haruki | 235/380 X |
| 4,253,158 | 2/1981 | McFiggans | 364/900 |
| 4,268,715 | 5/1981 | Atalla | 235/380 X |
| 4,281,215 | 7/1981 | Atalla | 380/24 X |
| 4,283,599 | 8/1981 | Atalla | 380/24 |
| 4,315,101 | 2/1982 | Atalla | 380/24 |
| 4,376,299 | 3/1983 | Rivest | 364/900 |
| 4,447,890 | 5/1984 | Duwel et al. | 364/900 |
| 4,471,216 | 9/1984 | Herve | 235/379 X |
| 4,590,470 | 5/1986 | Koenig | 380/23 |
| 4,629,871 | 12/1986 | Scribner et al. | 235/375 |

FOREIGN PATENT DOCUMENTS

| | | |
|---|---|---|
| 18129 | 10/1980 | European Pat. Off. . |
| 1417872 | 12/1975 | United Kingdom . |
| 2032224 | 4/1980 | United Kingdom . |
| 457 | 2/1984 | World Int. Prop. O. . |

*Primary Examiner*—Parshotam S. Lall
*Assistant Examiner*—Edward R. Cosimano
*Attorney, Agent, or Firm*—Horst M. Kasper

[57] ABSTRACT

The present invention provides a method for releasing and for controlled storage of a desired predetermined value into a preset value memory storage of a postage metering machine. Initial values are transmitted in each case from a postage metering machine to a release apparatus. A first key code word is determined by a first algorithm module section from initial values and from values stored in a first memory storage associated with the postage metering machine. A second key code word is determined by a second algorithm module section from initial values and from values stored in a visually readable table associated with a second memory storage in the release apparatus. The second key word is transmitted from the release apparatus to the postage metering machine, where it is stored in a storage memory section and compared with the first key word in a locked section of memory. A random number is generated in a random number generator in the postage metering machine and is transmitted to the release apparatus, where it is stored in the memory storage of the second algorithm module section as a seed value for a future transmitting of a second key word. The random number is stored in the memory storage of the first algorithm module section as a comparison value for a future unlocking.

20 Claims, 5 Drawing Sheets

VISUALLY READABLE FUNCTION TABLE

SYSTEM FOR RELEASE AND CONTROL OF PRESET STORAGE OF A POSTAGE METER MACHINE

CROSS-REFERENCE TO RELATED APPLICATIONS

This application is a continuation-in-part application of another international application filed under the Patent Cooperation treaty on 06 Mar. 1986 bearing Application No. PCT/CH86/00031, and listing the United States as a designated country. The entire disclosure of this latter application, including the drawings thereof, is hereby incorporated in this application as if fully set forth herein.

BACKGROUND OF THE INVENTION

1. Field of the Invention

The present invention relates to an apparatus and a method for release and controlled storage of desired preset amounts in a preset memory storage of a postage metering machine.

2. Brief Description of the Background of the Invention Including Prior Art

Postage meter machines operate according to the postal requirements in the respective country either according to the bill account method or according to the prepaid availability method. In the case of the prepaid availability method, if required, upon payment of a corresponding amount of money to an authorized office, for example the postmaster at a post office, the preset counter is adjusted by an amount that can be selected as desired. Thereupon the postage metering machine can be used as long as the preset amount has not been used up. Then there occurs a new requirement for another setting of the preset counter of the postage metering machine.

Thus, whenever an adjustment of the preset counter of a postage metering machine is necessary, conventionally it must be taken to the authorized office, which is cumbersome and requires considerable time.

A method and an apparatus for the remote setting of postage metering machines is known from British patent GB No. 1417872, which overcomes the recited disadvantage. According to this method, the user of the distributed and remotely stationed postage metering machine operates by telephone in conjunction with a central office. This office is equipped with a computer that calculates key words in each case from data transmitted, which include an authorization code of the user, and the authorized key value is to be sent to the postage metering machine. An electronic lock in the postage metering machine releases the predetermined amount only when the proper key code number is entered.

The security of this method with respect to unauthorized manipulations and metering without payment is based on cryptological methods known in principle, and this method appears to be sufficient for the purpose intended. However, the central location requires a computer, which means a substantial expenditure.

A method and an apparatus for securing of data transmission on an unsecured path in telephone systems is known from the Swiss patent No. 646,558, which has an equivalent in British patent No. 2,020,513. In this case, the two end points of the transmission path are each provided with an algorithm module, one of the end points in provided with a random number generator, and the other-end point is provided with a comparator.

Security is achieved by calculating a key number in the two algorithm modules from two starting values in each case, the key number then being compared in the comparator. One starting value is the random number generated in the random number generator, which is used in the two modules. The other starting value is an entered or, respectively, stored identification number. If the key numbers are equal, this serves as a proof for the correctness of the entered identification number.

SUMMARY OF THE INVENTION

1. Purposes of the Invention

It is an object of the invention to provide an apparatus and a method for the controlled release of preset values for postage metering machines placed at a desired location based on an authorized release location.

It is another object of the invention to provide a system for authorizing a postage meter machine to dispense postage that can be easily handled and requires relatively little expenditure at the release location.

It is a further object of the invention to provide a postage meter authorizing system that provides for sufficient security, according to present day cryptological knowledge, in connection with occasional controls of the postage metering machine.

These and other objects and advantages of the present invention will become evident from the description which follows.

2. Brief Description of the Invention

According to one aspect of the present invention, there is provided an apparatus for the release and controlled storage of desired predetermined values at a postage metering machine disposed at an arbitrary location in cooperation with a release apparatus.

The postage metering machine is provided with a comparator for comparing two key code words, thus furnishing an electronic lock which releases a predetermined value for storage in a preset storage memory as soon as the key code word determined in the release apparatus is entered into the postage metering machine. A first algorithmic module section, which includes an electronic, program controlled logic unit, is provided in the postage metering machine to form a first key code word. The postage metering machine also includes a random number generator and a first storage memory associated with the first algorithm module section for storing data values.

The release apparatus comprises a second algorithmic module section provided in the release station for forming a second key code word. A visually readable function table is included in the second algorithm logic unit, and a second storage memory is associated with the second algorithm module section for storing data values.

There is further provided means for the exchange of data between the postage metering machine and the release apparatus.

The visually readable function table can be provided as a printed product readable without special aids, or an enlargeable film can be employed as the carrier for the visually readable table. Alternatively, a memory storage, whose contents can be called up for display on an electronic display screen, can be employed for carrying the visually readable table.

A counter for determining a machine determined or manually determined time span can form part of the random number generator of the postage metering machine. A processor can be provided to recalculate the time span determined by the counter to another value.

According to another aspect of the present invention, there is provided a method for release and controlled storage of a desired predetermined value into a preset value memory storage of a postage metering machine. Initial values are transmitted in each case from a postage metering machine to a release apparatus. A first key code word is determined by a first algorithm module section from initial values and from values stored in a first memory storage associated with the postage metering machine. A second key code word is determined by a second algorithm module section from initial values and from values stored in a visually readable table associated with a second memory storage in the release apparatus. The second key word is transmitted from the release apparatus to the postage metering machine, where it is stored in a storage memory section and compared with the first key word in a lock section. A random number is generated in a random number generator in the postage metering machine and is transmitted to the release apparatus, where it is stored in the memory storage of the second algorithm module section as an initial value for a future transmitting of a second key word. The random number is stored in the first memory storage of the first algorithm module section as a comparison value for a future unlocking.

A machine determinable time span can be counted in a counter to generate a random number, and the random number can be recalculated to a key code word before transmitting. A numeric time value for generation of a random number can be determined as a time interval between two manual operations at the postage metering machine.

Alternatively, a manually determinable time span can be counted in a counter of a random number generator and recalculated into another value in a processor.

The same algorithm can be employed for the recalculation of the random number and for the determination of the first and second key code words.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
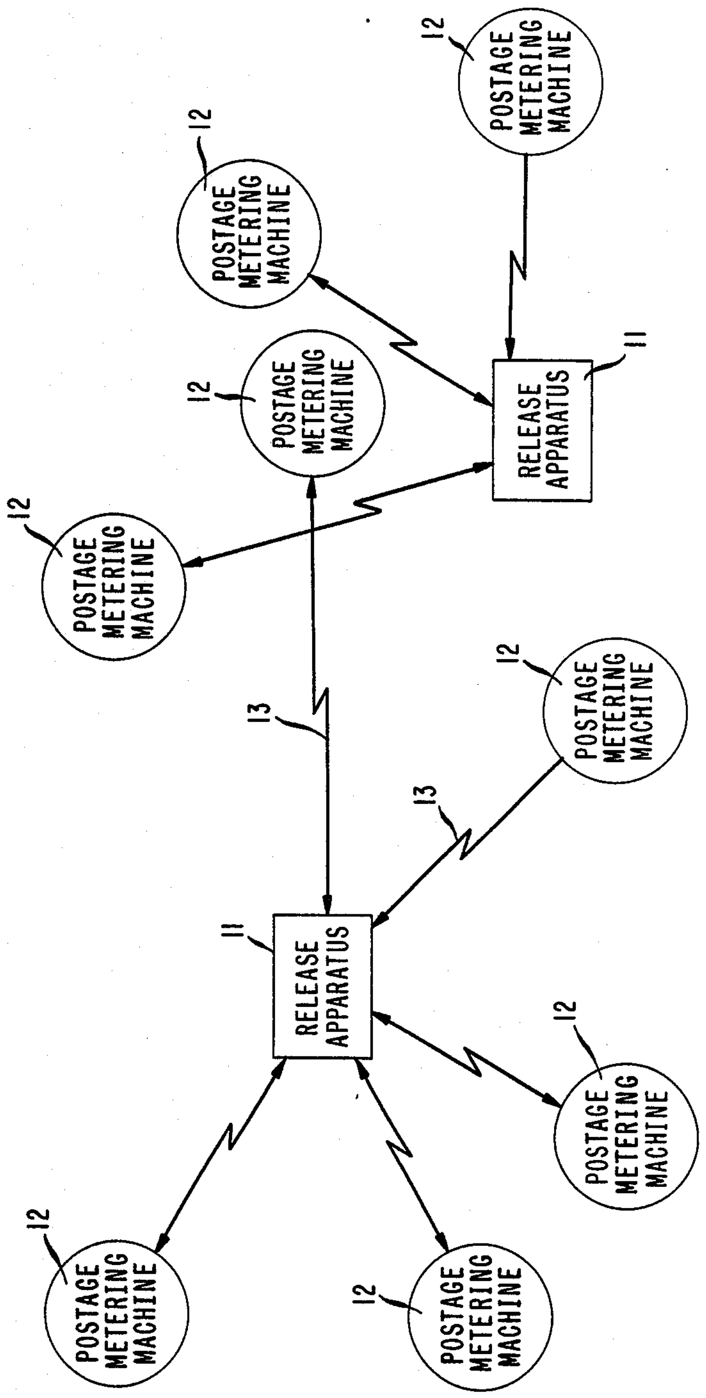
FIG. 1 is a schematic diagram illustrating the relative disposition of postage metering machines and release stations.

The present invention provides a system for releasing and controlled storing of desired predetermined values v in a preset memory storage 17 (FIG. 2) of a postage metering machine 12 (FIG. 1) disposed at a desired location in conjunction with a release apparatus 11, where means are furnished for the exchange of data between the postage metering machine 12 and the release apparatus 11.

The postage metering machine 12 is provided with an electronic lock 21, which releases the predetermined amount v for storing in the preset memory storage 17, which can serve as a counter, as soon as in each case the proper key code word r has been entered in the postage metering machine 12 as determined in the release apparatus. The lock 21 (FIG. 2) is formed as a comparator 30 for two key code words r, with the postage meter machine 12 provided with a first algorithm module section 28 for formation of the first key code word $r_1$ and the release apparatus 11 provided with a second algorithm module section for formation of a second key code word $r_2$.

The first algorithm module section 28 includes an electronic, program controlled logic unit. The second algorithm module includes a visually readable function table. The two algorithm module sections are associated with a respective memory storage 26 for storing data values.

The postage metering machine 12 includes a random number generator 24.

A counter can form part of the random number generator for determining a machine determined or manually determined time span. The time span determined by the counter can be recalculated to another value in a processor.

Initial values can be transmitted in each case from the postage metering machine 12 to the release apparatus 11. A first key code word can be determined from the initial values and from values stored in the memory storage 26 with the aid of a first algorithm module section 28, and a second key code word can be determined from the seed values and from values stored in a visually readable table of the second algorithm module. The second key code word $r_2$ can be transmitted from the release apparatus 11 to the postage meter machine 12 and stored in the postage meter machine 12 where the first key code word $r_1$ can be compared with the second key code word $r_2$. A random number i can be determined in each case with a random number generator 24 and can be transmitted to the release apparatus 11. This random number can be stored as a future initial value in memory storage 26 associated with each of the two algorithm module sections.

A machine determinable time span can be counted in a counter to generate a random number, and the random number can be recalculated in each case to a key code word before transmitting. A numeric time value for generation of a random number can be determined as a time interval between two manual operations at the postage metering machine. Alternatively, a manually determinable time span can be counted in a counter of a random number generator can recalculated into another value in a processor. In each case, the same algorithm can be used for recalculation of the random number and for determination of the first and second key code words.

FIG. 1 illustrates a schematic plan for the release locations 11 and decentralized postage metering machines 12 disposed at desired locations. The postage metering machines 12 operate according to the prepaid availability method, which will be called preset method in the following. This means that the user in each case has to contact the release station if the preset counter does not have available an amount sufficient for the desired postage. The contact can be performed, for example, via telephone communication devices such as telephones or telex. These communications provisions are illustrated in the drawing by double arrows 13 shown with double bends. The release stations 11, for example, can be local post offices. Each postage metering machine 12 can be coordinated to any release station 11 and in general retains its coordination to this release station. Metering machines in the same area thus can be coordinated without difficulty to different release stations 11.

Figure 2:
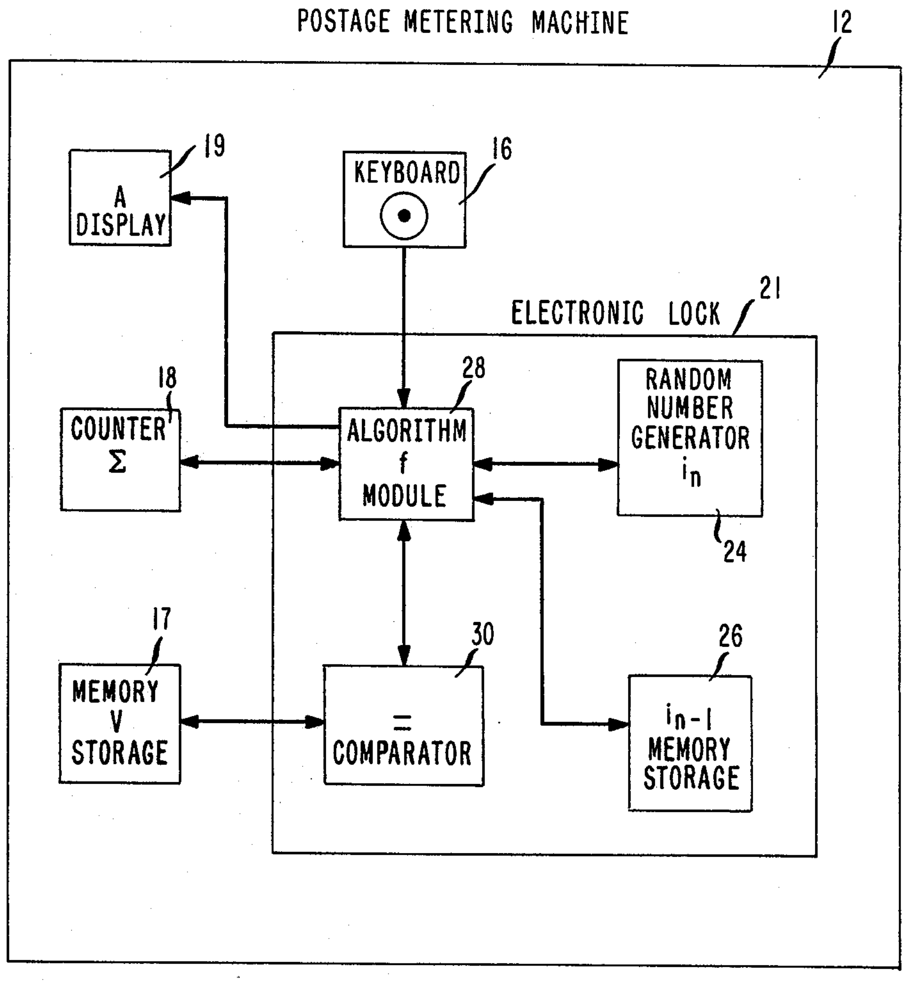
FIG. 2 is a schematic diagram of a postage metering machine.

FIG. 2 shows a general schematic view of a postage metering machine. This postage metering machine is provided in a conventional way with input means 16, for example adjustment levers and keyboard keys, which allow entry of the desired amount of postage. It further comprises a preset counter 17, where the postage amounts are subtracted from a preset amount, a sum counter 18, in which the postage meter amounts are added, and a display for illustrating the entered and counted numeric values.

The preset counter 17 is coordinated to an electronic lock 21 that must be opened if a preset amount, which of course can have any arbitrary value, is to be entered into the preset counter 17. The lock 21 is constructed according to cryptological considerations and cooperates with the coordinated release station 11 by way of mutual exchange of data. This data exchange is performed in the simplest way by a telephone contact between the user of the postage metering machine and the operators of the release station 11, but it can also be performed by telephone via a data or telex line.

The lock 21 comprises a random number generator 24, a storage for data 26, an algorithm module 28 for determining a key word $r_1$, and a comparator 30 for comparing the key word $r_1$ with a second key word $r_2$.

The algorithm module 28 is advantageously constructed by a program controlled logic, for example, by employing a microprocessor with coordinated program memory storage, where the intended algorithm is stored in a fixed way such as, for example, in a read only memory (ROM). The algorithm employs at least a noninvertible function f, for example, a function for generating pseudo-random numbers. Using this function f, the start values still to be entered are recalculated such that the key word $r_1$ generated in each case can not be predicted without an exact knowledge of the algorithm.

A random number $i_{n-1}$ stored in the memory storage 26 serves as one of the starting values. This random number i is generated anew in each presetting process by the random number generator 24, and it is then stored in order to be employed in the next presetting process. This means, in other words, that the random number i generated at the $n-1$ preset process is employed only at the n preset process as a starting value that is indicated by the index $n-1$.

Advantageously, the machine or authorization numbers of the postage metering machine in each case are employed as further starting values and the preset amount available at the time, v, is further employed as a start value. The machine number can be transmitted either together with the preset amount v or with the in each case determined random number $i_{n-1}$ upon each release process to the release station or, preferably, it is present in the release station in a stored form. The transmission can be performed either in a clear text file or in other desired forms. The recalculation of the random number i for the transmission increases the security and is advantageously performed with the aid of the already recited function f.

Advantageously, a time counter can serve as a random number generator and provides in each case either the count value between two determined manual operations at the postage metering machine or, preferably, a suitably recalculated value of this count value.

The central location 11 in principle determines according to the same noninvertible function f and from the same starting values, the second key word $r_2$, which is to be equal to the first key word $r_1$. However, no electronic provision is available to the central location 11 as an algorithm module. A visually readable table or list is available. This table can either be printed on paper or in booklet form or can be provided as a microfilm or can be entered on a magnetic card or in a semiconductor memory storage such that the table or list pairs can be made visible on an electronic display. In all these cases, a table, with its columns of continuous input values and with a substantial range of starting values displayed for easy survey, represents essentially the noninvertible function f. The table itself can be obtained with a printer connected to a computer, printing according to an algorithm corresponding to the generation of the first key work $r_1$. This algorithm calculates all starting values and prints them together with the coordinated input values.

The storage 26 of the lock 21 is preferably constructed as an electronic read-write memory storage with security against unintended erasing. In contrast, in the most simple case, the memory storage in the release station 11 can be a hand entry into a given form.

The method for releasing and for the controlled memory storing of a desired preset amount in the preset storage 17 of a postage metering machine works as follows. The user of the postage metering machine 12 actuates a key word for entering preset values and enters the desired amount v to be set via the keyboard 16 into the machine 12. The machine 12 thereupon calculates a random number $i_n$, a combination value k from the desired preset amount v and the machine number, and the first key word $r_1$. Thereupon, the random number $i_n$, advantageously in recalculated form, and the combination value k are shown on a display 19 and are transmitted to the release station 11 via telephone, for example. The release station 11 registers these values, determines the random chance number $i_n$ and stores it, and also determines the second key work $r_2$ using the random number $i_{n-1}$, already present from the preceding preset process and determined with aid of the visually readable table, and the receipt combination value k as start values. After this second key word $r_2$ has been transmitted and read into the postage metering machine via the keyboard 16, the comparator 30 compares the key words $r_1$ and $r_2$ and, if the key words $r_1$ and $r_2$ are equal, provides the preset value v for storing in the preset storage 17 for release. To terminate the preset entry process, the release station 11 has to perform the bookkeeping of the entry amount from a bookkeeping account of the operator of the postage metering machine in order to ensure payment, and the random number $i_n$ has to be stored in the postage metering 12 machine and in the release station 11 for the next release process.

As is shown in the description, the apparatus and the method are comparatively simple and uncomplicated and are connected with release stations that are not a single central location but are located spacially relatively close to the coordinated postage metering machines. Furthermore, the release stations can be of a relatively simple construction.

The system of the present invention provides considerable security, which can be further increased by adding to the postage meter machines 12 further memory storage elements where all preset processes ever permitted and all unauthorized manipulations are recorded. With occasional controls of the postage meter machines, erroneous manipulations and the like can be proved very easily based on the stored values. Furthermore, in each case, the full history of the transactions can be easily stored so that at a later time long time controls are possible or statistical data can be called up.

In addition, the counters allows the registration of predetermined values that is not performed in the way and manner described but in a conventional manner by a direct setting of the preset memory storage 17 by desired and authorized offices. Thus the personally easiest and most convenient way of performing the setting can be selected by the user of the postage metering machine.

The construction of the preset and sum counters 17 and 18 or, respectively, of the memory storage associated and corresponding to them can be as desired. The construction can include electronically adjustable, visually readable, mechanical counters such as, for example, roller counters, or semiconductor memory elements that are protected against the loss of information can be employed. In the latter case, there is a multitude of possibilities of organizing the memory storage and the matter stored therein.

The key words are preferably decimal numbers. However, it is possible with no difficulty to employ numbers of another basis. For example, binary numbers or letter combinations can also be employed as key words.

Referring now to FIG. 2, the input means 16, which conventionally can be a set level or a keyboard, the display 19 and the counters 17, 18, which, according to conventional construction, are mechanical roller counters with numerical description, are part of each postage meter machine and are well known in the prior art. Preferably, nonerasable semiconductor memory storages with digital display are employed to provide a numerical output. The algorithm module 28, as well as the data memory storage 26, are microprocessors such as the Intel 8088 processor. However, other processors also can be employed.

The random number generator 24 can be constructed according to various possibilities. The solution employed by the applicant as set forth above is particularly simple. The comparison circuit 30 is nothing more than an operational step of the microprocessor, which is a base function in each microcomputer.

The combination of the units 24, 26, 28 and 30, which results in the electronic lock, is known in the art and described for example in British patent GB No. 1,417,872, page 5, last paragraph to page 6, line 2.

It is an advantage of the present method that the release location 11 does not require a computer but, in the simplest case, requires only a table or list printed on paper.

While conventionally, a central large computer was employed, the method of the present invention requires only very simple and inexpensive support means. These means can be maintained ready in a decentralized way and fairly close to the customer, for example in a post office in each larger city, whereby in particular the telephone can be employed as a noncritical and inexpensive means of communication.

Figure 3:
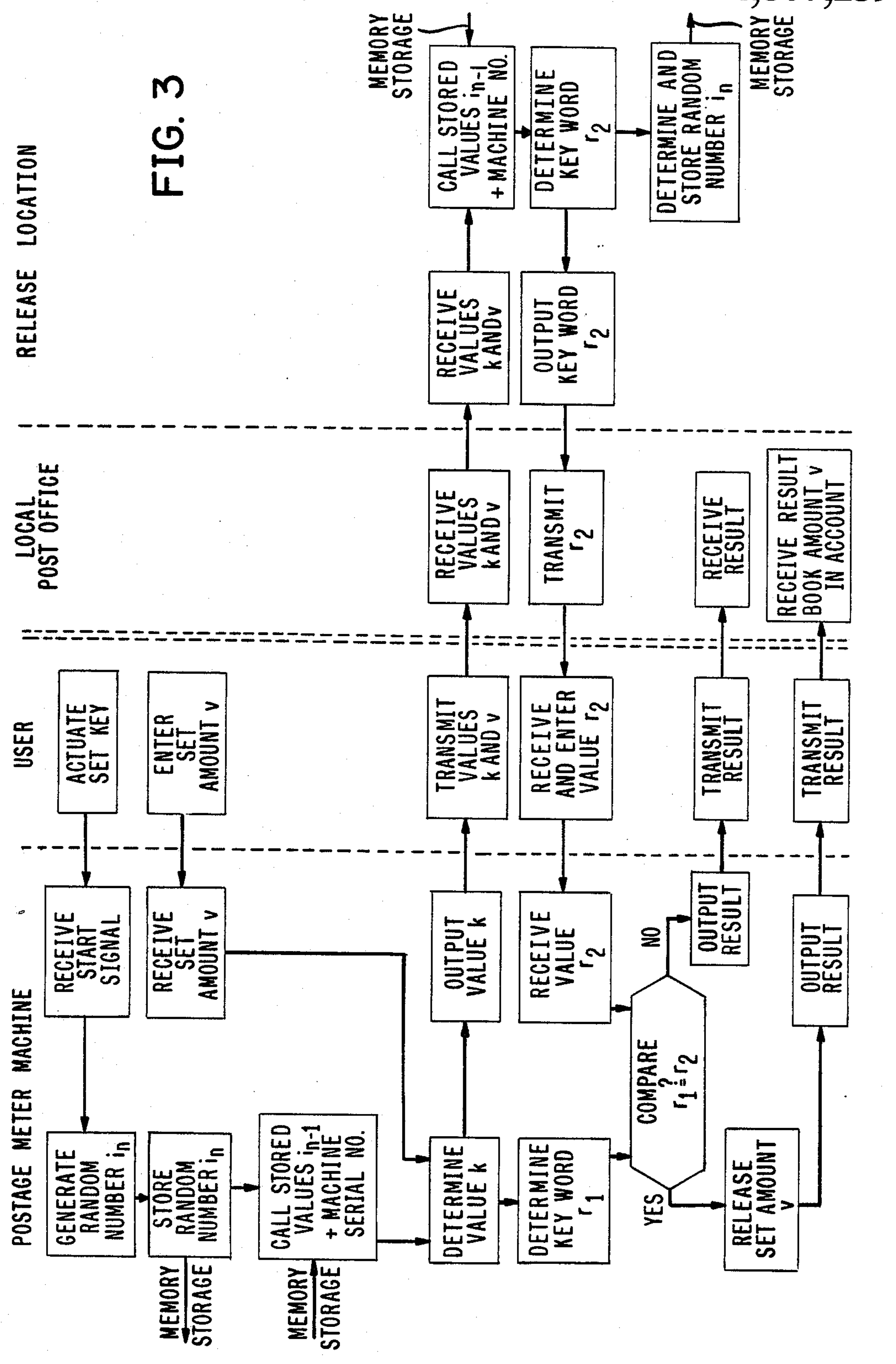
FIG. 3 is a view of a flow diagram showing the time path of the process of setting a postage metering machine according to the present invention.

Referring now to the flow diagrams, FIG. 3 shows four columns. The central separation line is provided as a double line in order to illustrate the spacial separation between the user with the postal metering machine 12 in each case and the release location 11, which may be located in some post office.

The time path of the process of setting the postage meter machine can be followed in FIG. 3 from top to bottom, and the mutual contact between the user and the post office is illustrated by dashed horizontal lines. For example, the contact can be performed via telephone as illustrated in FIG. 1.

When a user wishes to enter an amount v into the postage meter machine, he initially presses the start key. The postage meter machine thereby receives a starting signal, generates a random access number and places this random access number $i_n$ in a memory storage.

The user then uses the entering means 16, which can comprise a numerical keyboard, to enter the desired amount v into the postage metering machine and places a telephone call to the post office.

The postage metering machine takes the value of the random number $i_{n-1}$, which was stored from the preceding setting process, from the memory storage and possibly in addition also takes the serial number of the postage metering machine. The postage metering machine as a first step now calculates a value k from $i_n$, v and possibly the serial number of the postage metering machine and shows this value, for example on a display unit. The user reads this value k and transmits the desired setting amount v as well as the value k to the post office via the telephone. As a second step, the postage metering machine calculates one key word $r_1$ from $i_{n-1}$, v and possibly the serial number of the postage metering machine, by inserting them in the non-invertable function f.

The post office receives the values k and v. The value $i_{n-1}$ and the serial number of the postage metering machine is taken from the memory storage of the release station. These values can be, for example, hand written entries on a file sheet for the respective user.

The second key word $r_2$ is now determined from the values $i_{n-1}$, v and possibly the serial number of the postage metering machine through the use of a table or, respectively, a list, and this second key word $r_2$ is told to the user over the telephone.

The user enters the second key word $r_2$ into the postage metering machine whereupon the postage metering machine compares the two key words $r_1$ and $r_2$.

If the two key words $r_1$ and $r_2$ are not equal, then the postage metering machine indicates the presence of an error.

If, in contrast, the two key words $r_1$ and $r_2$ are, as desired, equal, then the postage metering machine releases the amount set and indicates readiness to begin operation.

The user transmits the result of the comparison of the two key words $r_1$ and $r_2$ in each case to the post office by telephone, and in case of a positive comparison, the post office books the amount to be set for the purpose of charging the account of the user.

The random number $i_n$ is then calculated from the already transmitted value k and is stored for the next process of advancing and setting the postage metering machine.

If the result of the comparison of the two key words $r_1$ and $r_2$ is negative, then the whole process can be repeated.

Figure 4:
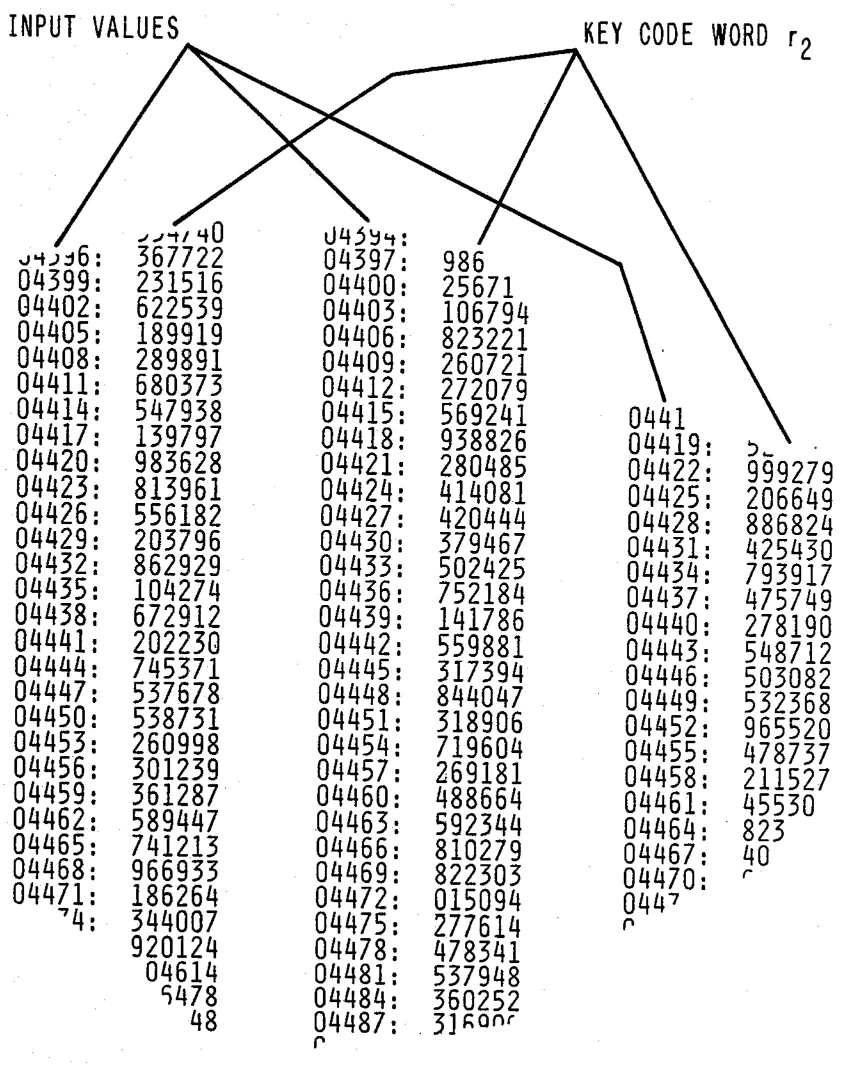
FIG. 4 shows an example of a visually readable function table to use for obtaining the value of the second key word.

FIG. 4 illustrates a part of a table printed on paper. In each of the three columns, the input values are set forth on the left side and the coordinated key word $r_2$ is shown on the right side. The table is to be read from left to right and from top to bottom.

Figure 5:
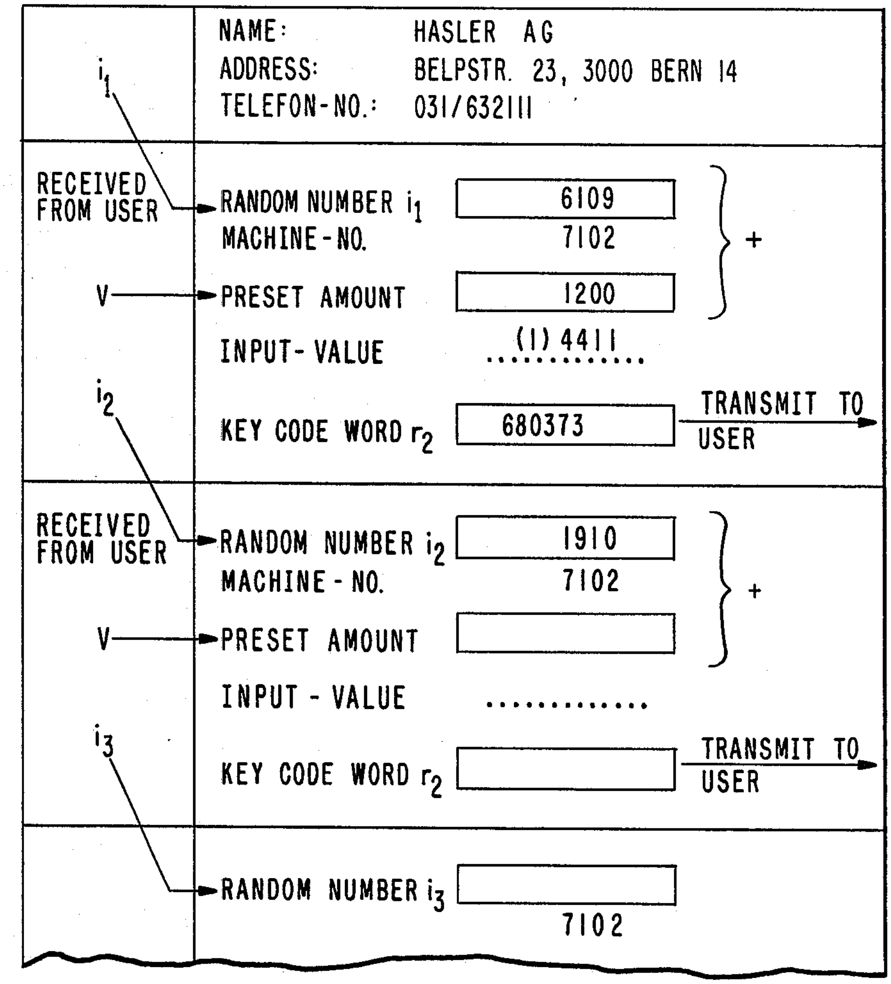
FIG. 5 shows an example of a form that can serve as a storage medium for the random numbers.

FIG. 5 illustrates an example of a form that can serve as a storage medium for the random numbers $i_n$. At the top the form has a space for the name, address and telephone number of the user. Then follow several spaces which are used from top to bottom and which serve in each case for the process of setting an amount. The amount v desired by the user is entered by hand in each case at the place provided for the processing. The value k, which in the simplest case can be equal to the random number $i_n$, is entered in the corresponding space of the next setting process of the postage meter.

The table input value is determined by addition of the value stored from the last setting process, that is, $i_{n-1}$, to the imprinted serial number of the machine and the amount v to be used, and is entered. The key word $r_2$ is read from the described table and transmitted to the user. Thereby the process is terminated for the release office 11.

In addition, the booking of the set amount v can be performed on the form. This however is not shown.

In order to increase security, the processes can be made more complicated as illustrated. This holds in particular for the transmission of the random number $i_n$, which can be embedded in the value k. In this case, space has to be provided for the calculation by which the random number $i_n$ can be regained from the value k.

It will be understood that each of the elements described above, or two or more together, may also find a useful application in other types of release and control of preset storage values differing from the types described above.

While the invention has been illustrated and described as embodied in the context of a system for release and control of preset storage of a postage meter machine, it is not intended to be limited to the details shown, since various modifications and structural changes may be made without department in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for controlled storage and release of desired predetermined values at a postage metering machine disposed at an arbitrary location in cooperation with a release apparatus wherein said postage metering machine comprises a first algorithmic module section provided in the postage metering machine for forming a first key code word and including an electronic, program controlled logic unit;

a random number generator disposed in the postage metering machine and connected to the first algorithmic module section;

a first storage memory associated with the first algorithm module section for storing data values; and a comparator for comparing a second key code word from said release apparatus to a first key code word within the postage metering machine furnishing an electronic lock which releases a predetermined value for storage in a preset storage memory as soon as the second key code word determined in the release apparatus is entered into the postage metering machine; and wherein the release apparatus comprises a second algorithmic module section provided in a release station for forming a second key code word; and a visually readable function table disposed in the release station; and a second storage memory associated with the second algorithm module section for storing data values;

and further comprising means for the exchange of data between the postage metering machine and the release apparatus.

2. The apparatus for controlled storage and release of desired predetermined values according to claim 1 wherein the visually readable table is provided as a printed product readable without special aids.

3. The apparatus for controlled storage and release of desired predetermined values according to claim 1 wherein an enlargeable film is employed as the carrier for the visually readable function table.

4. The apparatus for controlled storage and release of desired predetermined values according to claim 1 wherein a memory storage is employed for carrying the visually readable table, where the contents of the storage can be called up for display on an electronic display screen.

5. The apparatus for controlled storage and release of desired predetermined values according to claim 1 further comprising a counter forming part of the random number generator for counting pulses during a machine determined time span.

6. The apparatus for controlled storage and release of desired predetermined values according to claim 1 further comprising a counter forming part of the random number generator for determining a manually determined time span; and a processor for recalculating the time span determined by the counter to another value.

7. A method for controlled storage and for releasing of a desired predetermined value into a preset value memory storage of a postage metering machine comprising transmitting in each case seed values from a postage metering machine to a release apparatus;

determining a first key code word from initial values and from values stored in a first memory storage associated with the postage metering machine via a first algorithm module section;

determining a second key code word from initial values and from values stored in a visually readable table associated with a second memory storage in the release apparatus via a second algorithm module section;

transmitting the second key code word from the release apparatus to the postage metering machine;

storing the second key code word in a storage memory section in the postage metering machine;

comparing the first key code word from within the postage metering machine with the second key code word from said release apparatus furnishing an electronic lock;

generating a random number in a random number generator in the postage metering machine;

transmitting the random number to the release apparatus; storing the random number in the first memory storage of the first algorithm module section as a comparison value for a future unlocking; and storing the random number in the second memory storage of the second algorithm module section as an initial value for a future transmitting of a second key code word.

8. The method for controlled storage and for releasing of a desired predetermined value according to claim 7 further comprising determining a numeric time value for generation of the random number as a time interval between two manual operations at the postage metering machine.

9. The method for controlled storage and for releasing of a desired predetermined value according to claim 7 further comprising counting pulses during a manually predetermined time span in a counter of the random number generator; and recalculating the time span in a processor into another value.

10. The method for controlled storage and for releasing of a desired predetermined value according to claim 7 further comprising employing the same algorithm for a recalculation of the random number and for the determination of the first and second key code words.

11. The method for controlled storage and for releasing of a desired predetermined value according to claim 7 further comprising counting pulses during a machine determined time span in a counter for generating a random number.

12. The method for controlled storage and for releasing of a desired predetermined value according to claim 8 further comprising recalculating the random number in each case to a key code word before transmitting.

13. A system for controlled storing and for the release of desired predetermined values in a preset memory storage of a postage metering machine disposed at a desired location in conjunction with a release apparatus, where means are furnished for the exchange of data between the postage metering machine and the release apparatus, and wherein the postage metering machine is provided with an electronic lock, which releases the predetermined amount for storage in the preset memory storage as soon as in each case the proper key code word has been entered in the postage metering machine as determined in the release apparatus;

the improvement comprising wherein the postage meter machine is provided with a first algorithm module section for formation of the first key code word and where the release apparatus is provided with a second algorithm module section for formation of a second key code word;

wherein the lock is formed by a comparator connected to the first algorithm module section which comparator compares the first key code word and the second key code word;

wherein the first algorithm module section includes an electronic and program controlled logic unit and where the second algorithm module includes a visually readable function table at the release apparatus, wherein the postage metering machine includes a random number generator connected to the first algorithm module section, and wherein the two algorithm module sections are connected to and associated with a respective memory storage for the storing of data values.

14. The system for controlled storing and for the release of desired predetermined values according to claim 13 further comprising a counter forming part of the random number generator for counting pulses during a machine predetermined time span.

15. The system for controlled storing and for the release of desired predetermined values according to claim 13 further comprising a counter forming part of the random number generator for counting pulses during a manually predetermined time span; and a processor for recalculating the time span determined by the counter to another value.

16. The system for controlled storing and for the release of desired predetermined values according to claim 13 further comprising transmitting from the postage metering machine in each case initial values to the release apparatus, determining a first key code word from the initial values and from values stored in a memory storage with the aid of a first algorithm module section;

determining a second key code word from the initial values and from values stored in a visually readable table;

storing the second key code word transmitted from the release apparatus to the postage meter machine in the postage meter machine and comparing the first key code word the second key code word;

determining a random number in each case with the random number generator;

transmitting this random number to the release apparatus; and storing this random number in memory storage associated with each the two algorithm module sections as a future seed value.

17. The system for controlled storing and for the release of a desired predetermined value according to claim 16 further comprising counting pulses during a manually predetermined time span in a counter of the random number generator;

recalculating the time span in a processor into another value; and employing the same algorithm for the recalculation of the random number and for the determination of the first and second key code words.

18. The system for controlled storing and for the release of a desired predetermined value according to claim 16 further comprising counting pulses during a machine predetermined time span in a counter for generating the random number.

19. The system for controlled storing and for the release of a desired predetermined value according to claim 18 further comprising recalculating the random number in each case to a key code word before transmitting.

20. The system for controlled storing and for the release of a desired predetermined value according to claim 18 further comprising counting pulses corresponding to a numeric time value for generation of a random number based on a time interval between two manual operations at the postage metering machine.

* * * * *